US009450420B1

(12) United States Patent
Russell

(10) Patent No.: US 9,450,420 B1
(45) Date of Patent: Sep. 20, 2016

(54) ENERGY CONVEYANCE DEVICE

(71) Applicant: Stephen D. Russell, San Diego, CA (US)

(72) Inventor: Stephen D. Russell, San Diego, CA (US)

(73) Assignee: United States of America, as Represented by the Secretary of the Navy, Washington, DC (US)

( * ) Notice: Subject to any disclaimer, the term of this patent is extended or adjusted under 35 U.S.C. 154(b) by 721 days.

(21) Appl. No.: 13/914,319

(22) Filed: Jun. 10, 2013

(51) Int. Cl.
*H02J 1/00* (2006.01)
*H02J 3/00* (2006.01)
*H02J 4/00* (2006.01)

(52) U.S. Cl.
CPC ........................ *H02J 4/00* (2013.01)

(58) Field of Classification Search
CPC ..... H04B 11/00; G04C 10/00; H01L 41/107; Y10T 307/305
USPC ......................... 307/11, 18, 29, 38
See application file for complete search history.

(56) References Cited

U.S. PATENT DOCUMENTS

| | | | | |
|---|---|---|---|---|
| 6,525,996 B1 * | 2/2003 | Miyazawa | ............ | G04C 10/00 310/319 |
| 6,625,084 B1 * | 9/2003 | Payton | ................... | H04B 11/00 367/134 |
| 7,276,839 B1 * | 10/2007 | Monahan | ............. | G10K 11/006 310/322 |
| 7,501,726 B1 | 3/2009 | Waters | | |
| 7,692,340 B2 | 4/2010 | Waters | | |
| 2008/0258841 A1 * | 10/2008 | Sherrit | ................... | H01L 41/107 333/187 |
| 2009/0025454 A1 * | 1/2009 | Farrell | .................... | G01M 3/24 73/40.5 A |
| 2010/0298909 A1 * | 11/2010 | Weiss | ................. | A61N 1/37288 607/60 |
| 2013/0148472 A1 * | 6/2013 | Kovach | .................. | H04B 11/00 367/138 |

\* cited by examiner

*Primary Examiner* — Rexford Barnie
*Assistant Examiner* — Rasem Mourad
(74) *Attorney, Agent, or Firm* — SSC Pacific Patent Office; Arthur K. Samora; Kyle Eppele

(57) ABSTRACT

Devices and methods for conveying energy through a watertight enclosure can include placing at least one means for converting electrical energy into vibrational mechanical energy in direct contact with the enclosure. At least one means for harvesting the vibrational mechanical energy from the enclosure into electrical energy can also be placed in direct contact on the enclosure, on the opposite side of the enclosure from the conversion means. The conversion means and harvesting means both operate at a matching frequency ω. A plurality of transducers generating vibrations at frequency ω can be used in conjunction with harvester, or vice versa. Or, a plurality of transducers operating at discrete frequencies $\omega_n$ can be used in conjunction with a plurality of harvesters operating at matching frequencies $\omega_n$. These configurations can be used to transmit electrical energy through the watertight enclosure without breaking the watertight integrity of the enclosure.

12 Claims, 3 Drawing Sheets

US 9,450,420 B1

ENERGY CONVEYANCE DEVICE

FEDERALLY-SPONSORED RESEARCH AND DEVELOPMENT

This invention (Navy Case No. 101697) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-5118; email ssc_pac_T2@navy.mil.

FIELD OF THE INVENTION

The present invention pertains generally to energy conveyance devices. More particularly, the present invention pertains to energy conveyance devices that can transmit an electromotive force (EMF) to an electrical load without the use of a conductive wire. The invention is particularly, but not exclusively, useful as an energy conveyance device that can transmit an EMF through a barrier without penetrating the barrier, by placing a piezoelectric transducer-energy harvester "matched pair" on opposite sides of the barrier.

BACKGROUND OF THE INVENTION

Electrical energy conveyance is normally accomplished by the transmission of an electromotive force (EMF) or voltage over a conductive wire from a voltage source to a desired load for operation of an electrically activated device. There are situations, however, when there are barriers or obstructions which prevent the routing of a conductive wire to the location where one would want to use an electrically activated device. There are also situations where there is no obstruction, but it is dangerous or cost prohibitive to deploy a conductive wire to the location where one would want to use an electrically activated device. Therefore, there is a need for a device for conveying energy from one side of a structure to another side of a structure without requiring a feed-through (wire) which penetrates the structure.

In view of the above, it is an objective of the present invention to provide an energy conveyance device that transmits an EMF without a conductive wire. Another object of the present invention is to provide an energy conveyance device that transmits an EMF through a barrier to a device without requiring a feed-through which penetrates the barrier. Still another object of the present invention is to provide an energy conveyance device that uses a piezoelectric transducer-harvester "matched pair" to transmit an EMF without the use of conductive wires. Another object of the present invention is to provide an energy conveyance device that is easy to use, and that is easy to manufacture in a cost effective manner.

SUMMARY OF THE INVENTION

Methods and devices for conveying electrical energy through a watertight enclosure in accordance with several embodiments of the present invention can include the initial step of placing at least one means for converting electrical energy into vibrational mechanical energy in direct contact with the enclosure. The conversion means can be a piezoelectric transducer made of lithium niobate, barium titanate, lead zirconate titanate, and ceramics with perovskite or tungsten-bronze materials. A first mediator layer can be placed between the enclosure the conversion means, to facilitate the transmission of mechanical vibrational energy from the transducer into the enclosure structure.

A means for harvesting the vibrational mechanical energy into electrical energy can also be placed in direct contact with the enclosure. In several embodiments, a second mediator layer can be placed onto the enclosure and the harvesting means can be placed onto the second mediator layer. The second mediator layer can facilitate the recovery of mechanical vibration energy form the enclosure (in the case of the harvesting means).

For the devices and method of the present invention, the conversion means and harvesting means can both operate at a matching frequency $\omega$. In some embodiments, one conversion means can transmit at matching frequency $\omega$, while a plurality of harvesting means can operated at corresponding harvesting frequencies $\omega_1, \omega_2, \omega_3, \ldots, \omega_n$, all of which are equal to matching frequency $\omega$. In other embodiments, a plurality of conversions means having discrete conversion frequencies $\omega_1, \omega_2, \omega3, \omega_n$ can be provided, and plurality of harvesting means having corresponding harvesting frequencies $\omega_1, \omega_2, \omega3, \omega_n$ that match the conversion frequencies can be provided. The above methods can be used to transmit electrical energy through a watertight enclosure without breaking the watertight integrity of the enclosure.

BRIEF DESCRIPTION OF THE DRAWINGS

The novel features of the present invention will be best understood from the accompanying drawings, taken in conjunction with their accompanying descriptions, in which similarly-referenced characters refer to similarly-referenced parts, and in which.

DETAILED DESCRIPTION OF THE EMBODIMENTS

Figure 1:
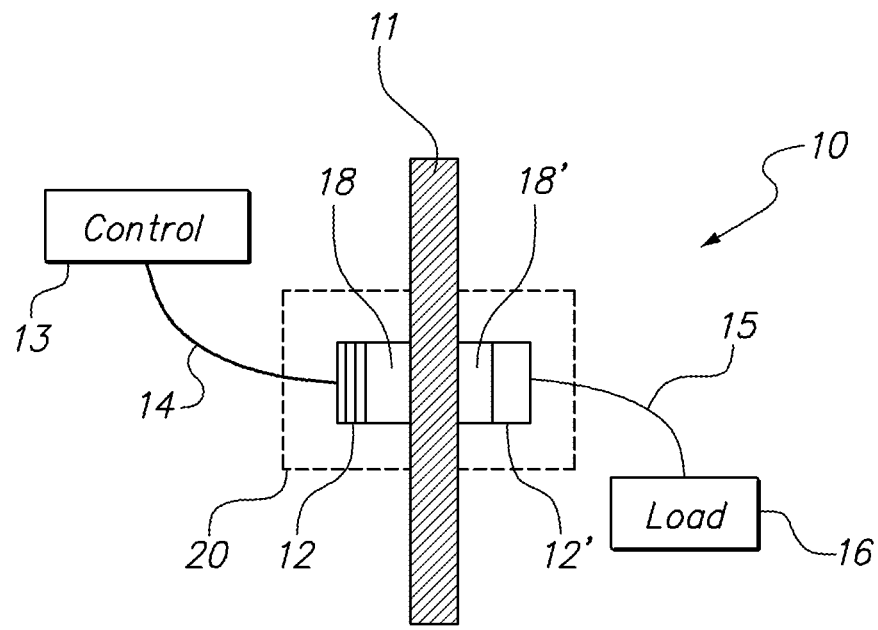
FIG. 1 is a diagram of an energy conveyance device according to several embodiments of the present invention.

This invention discloses a device for conveying energy from one side of a structure to another side of a structure without requiring a feed-through which penetrates the structure. Referring initially to FIG. 1, an energy conveyance device according to several embodiments of the present invention is shown and is generally designated by reference character 10. The device 10 requires one to provide an electromotive force (EMF), which can optionally be provided from control electronics 13, and then from an interconnection 14 from said EMF control electronics 13 to a piezoelectric transducer 12. Transducer 12 can be operably coupled to a barrier 11 by being placed in direct contact with barrier 11. If desired, a first mediator layer 18 (the thickness of layer 18 is greater exaggerated in FIG. 1) can be placed between transducer 12 and barrier 11 to facilitate transmission of mechanical vibrational energy from transducer 12 into the structure of barrier 11.

Device 10 can further include a kinetic energy harvester 12' operably coupled in direct contact with the barrier 11, and on the opposite side of barrier 11 from transducer 12. A second mediator layer 18' can be used, if desired. More specifically, second mediator layer 18' can be placed in direct contact with barrier 11 to facilitate the recovery of vibrational mechanical energy from the structure of barrier 11, and harvester 12' can be placed in direct contact with second mediator layer 18', as shown in FIG. 1. An interconnection 15 can be provided between said kinetic energy harvester 12' and an electrical load 16, for transmission of electrical energy to load 16. The transducer device 12 and harvester 12' can be consider a "matched pair", as depicted in FIG. 1 by a dashed line and reference character 20. The dashed line implies a matching of operating frequencies. For example, piezoelectric transducer 12 is selected for operation at frequency $\omega_1$ and kinetic energy harvester 12' is selected for detection of mechanical vibrational energy (vibrations) at frequency $\omega_1$. This "matched frequency" may be a resonant frequency inherent in an apparatus (the apparatus is not shown in the Figures), a frequency that can be input from the control electronics 13, a harmonic of the resonant or control frequency, or any component of the frequency spectrum of the resonant or control as desired for the job at hand. Thus, the transmission of EMF or energy/voltage through a structure (or barrier) without physical penetration of barrier 11 can be accomplished, by converting electrical energy to a specific frequency $\omega$ of vibrational/mechanical energy for a matched detection of said vibrational/mechanical energy, which has transmitted through barrier 11, for re-conversion to electrical energy of a specific frequency.

Interconnection 14 may be a conductive trace, such as a wire, waveguide or other conductive form connected to the piezoelectric transducer, e.g. an ultrasonic transducer known in the art. Similarly, interconnection 15 may be a conductive trace, such as a wire, waveguide or other conductive form connected to the load for energy usage or further energy distribution as known in the art. The EMF/voltage and associated control electronics 13 can cause the transducer to vibrate at frequency $\omega$, where $\omega$ may be tunable if desired, which can effectively convert electrical energy to mechanical energy.

The transducer 12 can be coupled to structure (barrier 11) so that the structure absorbs the mechanical vibrational energy. The mediator layer(s) 18, 18' mentioned above can assist in effectively transmitting the vibrational/mechanical energy to the structure or to the kinetic energy harvester. The mediator layer(s) may be a silicone grease or similar coupler as used in the art of non-destructive testing. Similarly, piezoelectric transducers are well known in the art of non-destructive testing, and use the piezoelectric effect to generate an internal mechanical strain in a crystal resulting from an applied electric field. Since this process is reversible, an alternating or pulsed voltage can be used to repeatedly create mechanical energy from electrical energy.

Examples of piezoelectric crystals that may be used in a piezoelectric transducer can include: lithium niobate, barium titanate, lead zirconate titanate, and other ceramics with perovskite or tungsten-bronze structures. Examples of kinetic energy harvesters 12' can include those found in U.S. Pat. No. 7,501,729 by Waters et al. for an invention entitled "Micro-Electro-Mechanical System (MEMS) and Apparatus for Generating Power Responsive to Mechanical Vibration", which issued 10 Mar. 2009 and which is assigned to the same assignee as the present invention. Another possible harvester can be as described in U.S. Pat. No. 7,692,340 by Waters et al., for an invention entitled "Apparatus for Generating Power Responsive to Mechanical Vibration", which issued 6 Apr. 2010 and which is also assigned to the same assignee as the present invention. Commercially available free-standing vibration energy harvesters, such as the Model PMG FSH that is manufactured by Perpetuum, could also be used.

Figure 2:
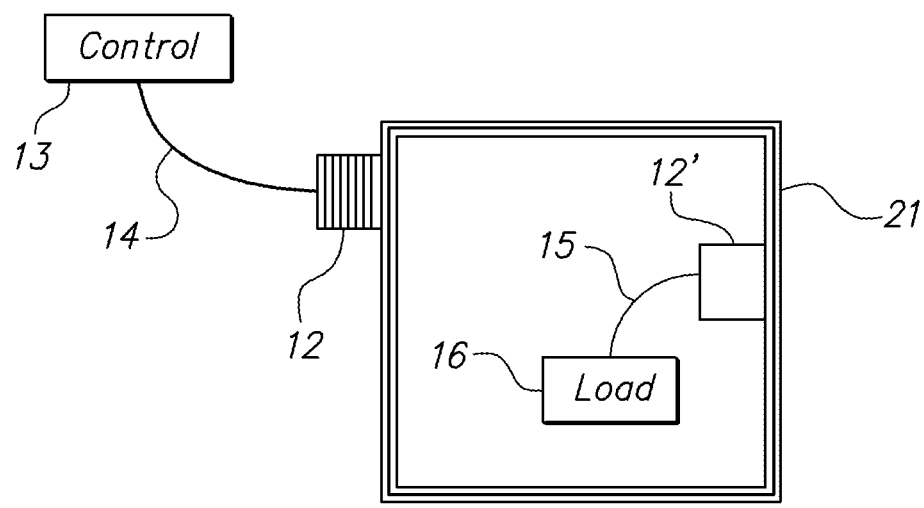
FIG. 2 is a diagram of several alternative embodiments of the energy conveyance device of FIG. 1.

Referring now to FIG. 2, FIG. 2 can depict schematically one use of this invention to convey energy to the inside of an otherwise enclosed watertight enclosure 21 (in the specification, watertight integrity can be taken to mean that enclosure 21 places transducer 12 and harvester 12', i.e., the interior and exterior of enclosure 21 in fluid isolation from each other). This may be useful in pressure containers or structures that are in hazardous environments, or otherwise difficult to reach or reconfigure. Note from FIG. 2 that transducer 12 and the matched kinetic energy harvester 12' need not be directly across enclosure 21 from transducer. Harvester 12' merely needs to be in direct contact with enclosure 21 (or in contact with mediator layer 18' which is in contact with enclosure 21) in order to be operably coupled to the transducer 12 of the matched frequency $\omega$. In this manner, an EMF can be transferred from a source to a load 16 that is spaced-apart from and in fluid isolation from the EMF source (control 13).

Figure 3:
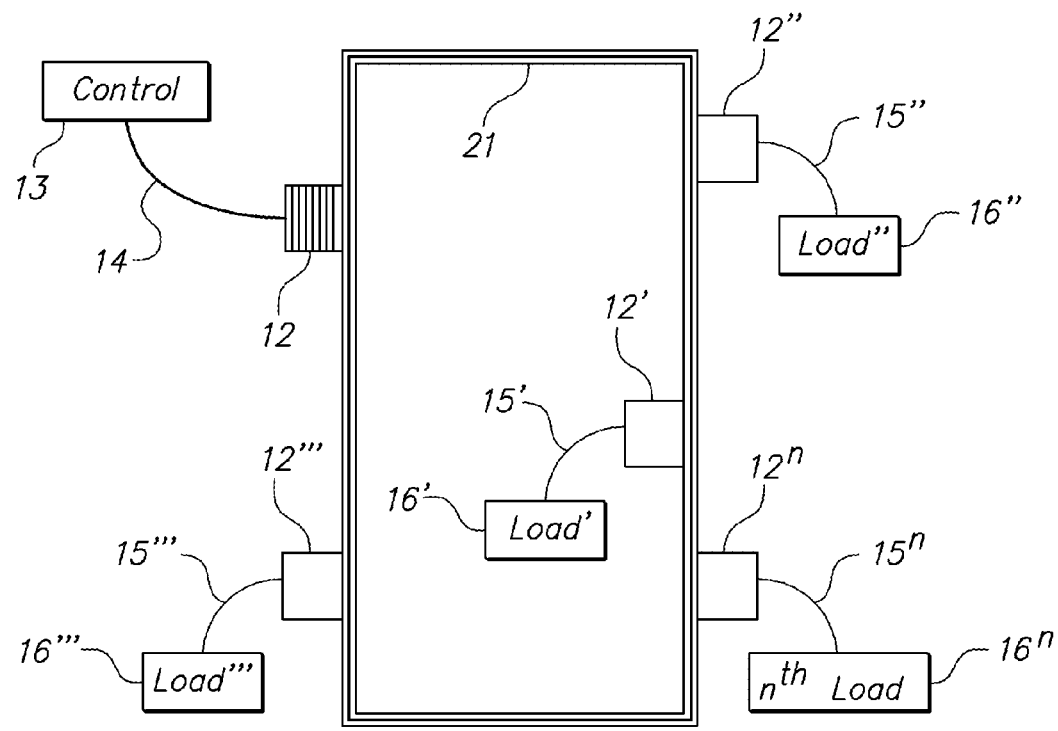
FIG. 3 is a diagram of several other alternative embodiments of the energy conveyance devices of FIG. 1 and FIG. 2.

FIG. 3 can depict several alternative embodiments of the present invention wherein one transducer 12, and a corresponding matched kinetic energy harvesters 12', 12", 12''' ..., 12" and corresponding n loads are distributed as required on any portion of the structure, internally and/or externally. Each harvester 12', 12", 12''' ..., 12" can correspond to a respective load 16', 16", 16''' ... 16". Alternatively, the plurality of harvesters 12 can each be connected to the same load (for example load 16') for increased application of EMF to a specific load 16'. With this configuration, the device 10 can simultaneously provide an EMF from a source (control 13) to loads 16', 16" and 16n that are both spaced-apart from the source and both inside and outside of enclosure 21. In still other embodiments, a plurality of transducers 12" can be placed in direct contact with enclosure 21, to generate mechanical vibrational at a frequency $\omega$ which can be matched to one load (load 16", for example). All of the above can be accomplished without affecting the watertight integrity of enclosure 21.

Figure 4:
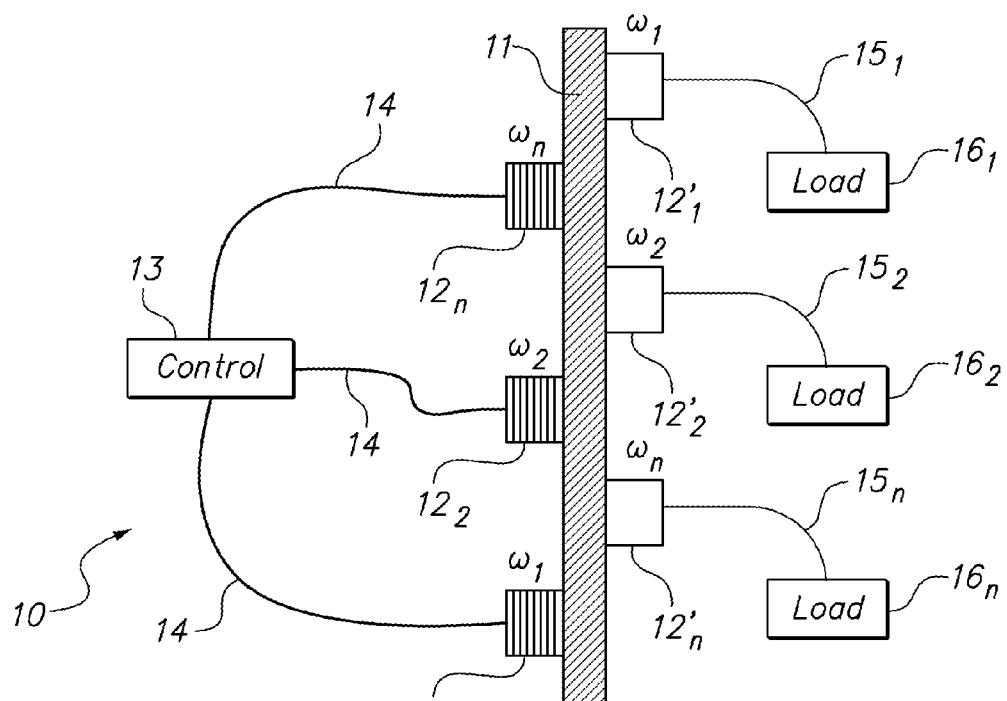
FIG. 4 is a diagram of several still other alternative embodiments of the energy conveyance devices of FIGS. 1, 2 and 3; and, FIG. 5 is a block diagram, which illustrates steps that can be taken to practice the methods of the invention according to several embodiments.

FIG. 4 can depict still other alternative embodiments of the energy conveyance devices of the present invention, wherein a plurality of transducers $12_1$, $12_2$, $12_3$, ... $12_n$ are operating (generating mechanical vibrational energy) at frequencies $\omega_1$, $\omega_2$, $\omega_3$, ... $\omega_n$ respectively as controlled by control electronics 13, and matched kinetic energy harvesters $12'_1$, $12'_2$, $12'_3$ ..., $12'_n$ and corresponding n loads are distributed as required on any portion of the structure, internally and/or externally. Note that in FIG. 4, the subscripts correspond to the operational frequencies of the matched transducers-kinetic energy harvesters. In this schematic, a single controller 13 can be interconnected to transducers $12_1$, $12_2$, $12_3$, ... $12_n$ using interconnection(s) 14, although individual controllers may be used if desired. Kinetic energy harvesters $12'_1$, $12'_2$, $12'_3$ ..., $12'_n$ can be interconnected to their corresponding n loads $16_1$, $16_2$, $16_3$, ... $16_n$ by interconnections $15_1$, $15_2$, $15_3$, ... $15_n$. Thus, each transducer $12_n$, operating at a discrete frequency $\omega_n$ may have one or more matched kinetic energy harvesters operating at frequency $\omega_n$ and thus conveying energy only to corresponding load n. The number of kinetic energy harvesters and corresponding loads does not have to match the number if transducers, thus energy can be conveyed and distributed as required to different loads at different locations by selection of the operating frequency of the transducer (s) $12_1, 12_2, 12_3, \ldots 12_n$.

With this configuration, different loads 16 can be energized, according to the needs of the operator, through the activation of control 13 and a given frequency $\omega_1, \omega_2, \omega_3, \ldots \omega_n$ that corresponds to the load $16_1, 16_2, 16_3, \ldots 16_n$ to be energized. Activation at the specific frequency $\omega_1, \omega_2, \omega_3, \ldots \omega_n$ can cause excitation of the corresponding transducer $12_1, 12_2, 12_3, \ldots 12_n$, which can further generate mechanical vibrations that can pass through barrier 11 and can be converted back to electrical by the respective harvester $12'_1, 12'_2, 12'_3 \ldots, 12'_n$ and transmitted to activate load $16_1, 16_2, 16_3, \ldots 16_n$ as described above.

From the above, it can be seen that the device 10 can convey electrical energy from one side of a structure to another side of a structure without requiring a feed-through which penetrates the structure, thus providing for ease in fabrication or retrofitting. It also allows for selectively distributing energy to selected load by using frequency control. The piezoelectric transducer and kinetic energy harvester are a "matched pair" which can enable the key performance properties of this invention, i.e. the conversion of electrical energy to mechanical vibration energy at transfer 12, transmission of mechanical vibrational energy through barrier 11/enclosure 21, and then conversion back to electrical energy at harvester 12' at the corresponding frequency of the matched pair. As described above, the present invention can also provide for the additional capability of selectively distributing energy to a selected load based on frequency, thus one can selectively turn on and off a device based on the frequency of the energy conveyed. This is not taught or suggested by the prior art, although both piezoelectric transducers and kinetic energy harvesters are separately known in their respective fields of application.

This device 10 may also be used as a means for charging one or more selected electrical devices using the distribution of electromechanical energy disclosed herein. The above disclosed invention may be used to couple energy to a structure, e.g. the frame of a house, and redistribute that energy selectively (based on frequency) without the need for additional wiring to the point of use. This invention may also be used as a sensor to recognize a change in electrical or mechanical frequency of a device and correspondingly energize an appropriate kinetic energy harvester which will turn on/off a load which could be an alarm or an actuator.

Figure 5:
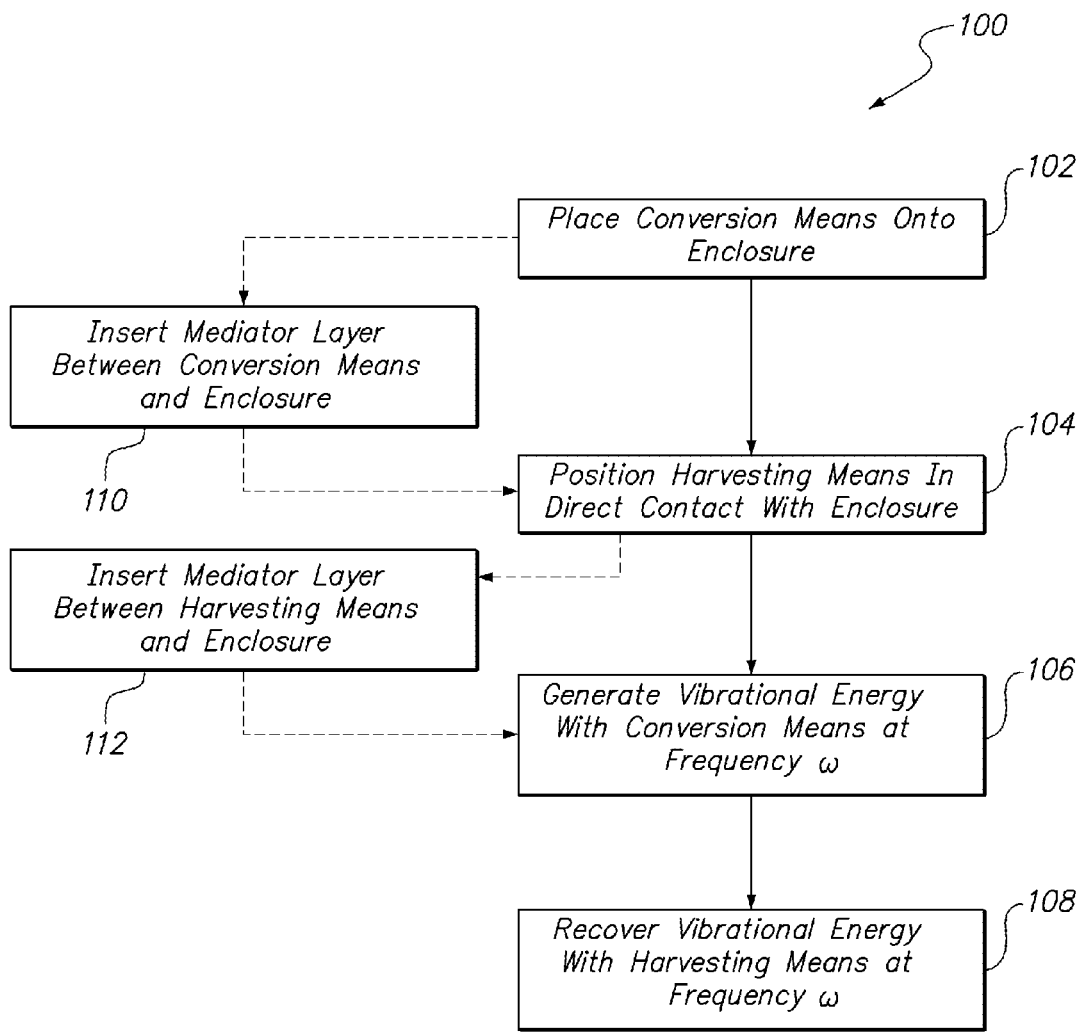

Referring now to FIG. 5, a block diagram 100 can be used to illustrate how the method of the present invention according to several embodiments can be practiced. As shown, method 100 can include the initial step 102 of placing a conversion means onto an enclosure 21, in direct contact with enclosure 21. As shown by step 104, the methods can include placement of an energy harvester 12' in direct contact with enclosure 21. The methods can further include the step of generating mechanical vibrational energy with the conversion means at a frequency $\omega$, as depicted by box 106 and recovery of vibrations from enclosure 21 by harvesting means 12', as shown by box 108 in FIG. 5.

The methods can include the optional step 100 of including a first mediator layer 18 between conversion means 12 and enclosure 21, to facilitate the transmission of vibrations into the structure of the enclosure 21. As also shown in FIG. 5, the methods can include the optional step of inserting a second mediator lay 34 18' between enclosure 21 and harvesting means 12', to facility the recovery of vibrations that have transmitted through the enclosure 21. The steps of the methods of the present invention according to several embodiments can be performed using various materials and arrangements of the control electronics 12, conversion means 12 and harvesting means 12' as described above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for conveying energy through a barrier defining an enclosure without penetrating the barrier, said device comprising:

a transducer for selectively converting electrical energy into vibrational mechanical energy at a plurality of discrete frequencies $\omega_1, \omega_2, \omega_3, \ldots, \omega_n$, said transducer placed in direct contact with said barrier;

a plurality of harvesters for harvesting said vibrational mechanical energy into electrical energy, each of said harvesters in direct contact with said barrier and operating at a respective said discrete frequency $\omega_1, \omega_2, \omega_3 \ldots \omega_n$;

said plurality of harvesters being oriented so that at least one of said plurality of harvesters is within said enclosure and at least one other of said plurality of harvesters is outside of said enclosure;

a control connected to said transducer, said control causing said transducer to operate at a discrete said frequency $\omega_1, \omega_2, \omega_3 \ldots \omega_n$ and, one of said harvesters being adapted to operate at a matching frequency $\omega$ from the same said transducer.

2. The device of claim 1, further comprising at least one first mediator layer placed between said transducer and said barrier, so that said at least one first mediator layer is in contact with said barrier and said transducer is in contact with said at least one first mediator layer.

3. The device of claim 1, further comprising at least one second mediator layer placed between each of said plurality of harvesters and said barrier, so that said at least one second mediator layer is in contact with said barrier and each of said plurality of harvesters is in contact with said at least one second mediator layer.

4. The device of claim 1 wherein said transducer is a piezoelectric transducer made of materials selected from the group consisting of lithium niobate, barium titanate, lead zirconate titanate, and ceramics with perovskite or tungsten-bronze materials.

5. A device for conveying energy through an enclosure, said enclosure having watertight integrity, said device conveying said energy without breaking said watertight integrity, said device comprising:

one piezoelectric transducer placed in direct contact with said enclosure and external to said enclosure, said transducer converting electrical energy into vibrational mechanical energy at a plurality of discrete frequencies $\omega_1, \omega_2, \omega_3, \ldots \omega_n$;

a control connected to said transducer, said control selectively causing said transducer to convert said mechanical energy at one of said discrete frequencies $\omega_1, \omega_2, \omega_3, \ldots \omega_n$;

a plurality of harvesters for harvesting vibrational mechanical energy into electrical energy, each of said plurality of harvesters being placed in direct contact with said enclosure, and within said enclosure in fluid isolation from said piezoelectric transducer;

each of said plurality of harvesters harvesting said vibrational mechanical energy into electrical energy at a respective said discrete frequency $\omega_1, \omega_2, \omega_3, \ldots w_n$; and, said transducer adapted to convert said electrical energy into vibrational energy at one of said discrete frequencies $\omega_1, \omega_2, \omega_3, \ldots \omega_n$ based on an input from said control, and said at least one harvester being adapted to harvest mechanical vibrational energy from said transducer at a matching said discrete frequency $\omega_1, \omega_2, \omega_3 \ldots \omega_n$.

6. The device of claim 5, further comprising at least one first mediator layer placed between said at least transducer and said enclosure, so that said at least one first mediator layer is in contact with said enclosure and said at least one transducer is in contact with said at least one first mediator layer.

7. The device of claim 5, further comprising at least one second mediator layer placed between said at least one harvester and said enclosure, so that said at least one second mediator layer is in contact with said enclosure and said at least one harvester is in contact with said at least one second mediator layer.

8. The device of claim 5 wherein said transducer is selected from the group consisting of lithium niobate, barium titanate, lead zirconate titanate, and ceramics with perovskite or tungsten-bronze materials.

9. A method for transmitting electrical energy through an enclosure having watertight integrity, said method comprising the steps of:

A) placing one transducer for converting electrical energy into vibrational mechanical energy in direct contact with said enclosure at a plurality of discrete frequencies $\omega_1, \omega_2, \omega_3, \ldots \omega_n$;

B) positioning a plurality of harvesters for harvesting said vibrational mechanical energy into electrical energy in direct contact with said enclosure, and within said enclosure in fluid isolation from said transducer; each of said plurality of harvesters harvesting said vibrational mechanical energy into electrical energy at a respective said discrete frequency $\omega_1, \omega_2, \omega_3, \ldots \omega_n$;

C) selectively generating vibrational energy with said transducer at the plurality of discrete frequencies $\omega_1, \omega_2, \omega_3, \ldots \omega_n$;

D) recovering said vibrational energy from said enclosure with one of said harvesters at a corresponding said discrete frequency $\omega_1, \omega_2, \omega_3, \ldots \omega_n$ from said step C; and, said step A) through said step D) being accomplished without breaking said watertight integrity.

10. The method of claim 9, wherein said step A) is accomplished with a said at least one transducer that is made of materials selected from the group consisting of lithium niobate, barium titanate, lead zirconate titanate, and ceramics with perovskite or tungsten-bronze materials.

11. The method of claim 9, further comprising the step of:
E) inserting a first mediator layer between said enclosure and said transducer so that said first mediator layer contacts said enclosure and said transducer contacts said first mediator layer.

12. The method of claim 9, further comprising the step of:
F) inserting a second mediator layer between said enclosure and each of said plurality of harvesters so that said second mediator layer contacts said enclosure and each of said plurality of harvesters contacts said second mediator layer.

* * * * *